United States Patent [19]

Hiemeleers et al.

[11] 4,102,976

[45] Jul. 25, 1978

[54] TREATMENT OF ORES OR METALLURGICAL BY-PRODUCTS CONTAINING ARSENIC AND ANTIMONY

[75] Inventors: Jozef Hiemeleers, Olen; Achille De Schepper, Lichtarrt; Antoine Van Peteghem, Olen, all of Belgium

[73] Assignee: Metallurgie Hoboken-Overpelt, Brussels, Belgium

[21] Appl. No.: 667,933

[22] Filed: Mar. 18, 1976

[30] Foreign Application Priority Data

Apr. 1, 1975 [LU] Luxembourg ............................ 72186
May 14, 1975 [LU] Luxembourg ............................ 72477

[51] Int. Cl.$^2$ ....................... C01B 27/00; C01B 29/00
[52] U.S. Cl. .................................... 423/87; 75/101 R; 75/121
[58] Field of Search ............... 423/87; 75/101 R, 121, 75/101 BE

[56] References Cited

U.S. PATENT DOCUMENTS

900,454   10/1908   Wadhams et al. ...................... 423/87

FOREIGN PATENT DOCUMENTS

1,161,432   1/1964   Fed. Rep. of Germany ......... 423/87
778,663   7/1974   U.S.S.R. ................................ 423/544

OTHER PUBLICATIONS

Marcus et al., Ion Exchange and Solvent Extraction of Metal Complexes, Wiley-Interscience, (1969), pp. 690–694, 706–708, 710, 957.

Chemical Abstracts, vol. 74 (1971), No. 33756g.

Kimura, "Inorganic Extraction Studies on the System Between Bis(2-ethylhexyl)-orthophosphoric Acid and HCl(I)," vol. 33, No. 8 (Jan. 1960), pp. 1038–1046.

Blake et al., "Proceeding of the Second International on the Peaceful Uses of Atomic Energy," A/Conf. 151p (1958), pp. 289–298.

Morrison et al., "Solvent Extraction in Analytical Chemistry," (1957), John Wiley & Sons, Inc., pp. 162–166.

*Primary Examiner*—O. R. Vertiz
*Assistant Examiner*—Wayne A. Langel
*Attorney, Agent, or Firm*—Fred Philpitt

[57] ABSTRACT

In a process for treating a metal bearing material containing arsenic and antimony by leaching in an acid solution with an oxygen-containing gas under pressure at a temperature of between 20° and 200° C, the improvement which consists in adding at least one element chosen from the group consisting of arsenic and phosphorus in such an amount to the leach mixture that the molar ratio (As + 4P) : Sb therein shall be at least equal to 8, thus dissolving at least the major part of the arsenic and antimony contained in the starting material.

38 Claims, No Drawings

TREATMENT OF ORES OR METALLURGICAL BY-PRODUCTS CONTAINING ARSENIC AND ANTIMONY

This invention relates to a process for the hydrometallurgical treatment of ores or metallurgical by-products containing arsenic and antimony, such as for instance speiss.

It is known from the German Pat. No. 1.049.105 to treat speiss by leaching, in an acid solution, at a temperature of between 100° and 200° C and under partial oxygen pressure of between 1 and 20 atm. The drawback of this process is however, that the antimony remains in the undissolved residue.

The German Pat. No. 1.161.432, which describes an improvement of the above process, prescribes a lower temperature and an increase of the stirring intensity. However, this mode of treatment has been found to leave still most of the antimony in the undissolved residue.

It is also known, see German patent application No. 2.020.308, to use speiss in order to activate the oxydation of $As_2O_3$ contained for instance in fly ash, when such a material is leached in an acid solution and at a temperature of between 80° and 170° C, with oxygen under pressure. As it appears from the example 4 of that application, most of the antimony contained in the feed material remains in the undissolved residue.

It is to be noted that in the examples described in the above mentioned patents and patent application, the molar ratio As:Sb in the leach mixture is always less than 6.5.

The process according to the present invention yields good dissolution rates for arsenic and antimony, which may reach, or even exceed in some cases, 98%.

The present invention relates to a process for the treatment of ores or metallurgical by-products containing arsenic and antimony by leaching in acid solution with oxygen or with a gas containing oxygen under pressure, at a temperature of between 20° and 200° C, and is characterized in that As and/or P are added to the leach mixture so that the molar ratio (As + 4P):Sb therein is at least equal to 8 and, preferably, comprised between 10 and 40.

It is advantageous to maintain the arsenic concentration in the leach solution to less than about 250 g/liter in order to obtain a good dissolution yield of the arsenates which are formed during the leaching process and of the arsenic itself.

As and P may be added under any form; however, it has been proved advantageous to add them in the form of their pentavalent or trivalent acids or oxides.

The amount of acid may be limited to the amount necessary to transform the metals contained in the feed material into salts.

Preferably, the leaching is carried out by means of a solution of sulfuric acid. Good results are also obtained with hydrochloric and nitric acid. It is also possible to carry out the leaching in a solution of arsenic or phosphoric acid; arsenates and phosphates are then formed the major part of which is insoluble in the leach mixture. By adding then, for instance sulphuric acid, to transform the arsenates or phosphates into sulphates, the same result is obtained as when sulphuric acid is used for leaching the feed material.

The process according to the present invention is particularly well suited for treating speiss. The latter are preferably leached at a temperature of between 50° and 70° C.

It may be useful to leach according to the process of the present invention the residue resulting from a previous leach, in order to obtain very poor residues, of As (for instance 0.06%) and Sb (for instance 0.49%).

For the further treatment of the attack solutions it is particularly advantageous to use the hereafter described Applicant's liquid-liquid extraction processes for the treatment of acid solutions of metals containing arsenic and antimony and possibly phosphorus, and having a molar ratio (As + 4P):Sb at least equal to 8.

It has been found that arsenic and antimony can be simultaneously extracted from the said solutions by means of an organic liquid containing:

(a) 2–30% by volume, preferably 5 – 25%, of an alkylated 8-hydroxyquinoline,
(b) 5–80% by volume, of an extractant chosen from the group of extractants consisting of:
(a') the phosphonic acid esters having the general formula

the phosphonous acid esters having the general formula $R_1—P(OR_2)—OR_3$, the phosphinic acid esters having the general formula

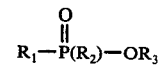

and the phosphinous acid esters having the general formula $R_1—P(R_2)—OR_3$, wherein $R_1$, $R_2$ and $R_3$ represent the same or different, unsubstituted or substituted hydrocarbon groups, and
(b') the organophosphoric compounds having the general formula $(RO)_3P = 0$, wherein R represents an unsubstituted or substituted alkyl, aryl or aralkyl group, and
(c) an inert organic diluent, the acid content of the aqueous phase being maintained at at least 1N during the extraction in order to limit the co-extraction of other elements such as copper.

It may be useful to treat the organic liquid with an acid solution before using it for the extraction, more particularly in order to maintain during the extraction the above mentioned acid content of the aqueous phase.

The organic liquid may contain up to 30% in volume of a stabilizer in order to facilitate the phase separation, preferably of a long chain aliphatic alcohol, such as isodecanol.

After extraction, the organic liquid may be regenerated by washing it first with an acid solution, the concentration of which being less than 1N, or with water to re-extract arsenic, and by treating it afterwards either with a base in the solid or dissolved state, or with a metal powder cementing antimony in order to recover the antimony. Between the reextraction of arsenic and that of antimony it is advantageous to wash the organic liquid with water in order to extract the major part of the acid.

It has also been found that antimony may be selectively extracted from acid metal solutions containing arsenic, antimony and possibly phosphorus, and having a molar ratio (As + 4P):Sb at least equal to 8, by means of an organic liquid containing:
(a) 2 - 30% by volume, preferably 5-25%, of an alkylated 8-hydroxyquinoline, and
(b) an inert organic diluent,
the acid content of the aqueous phase being maintained at at least 1N during the extraction in order to limit the co-extraction of other elements such as copper.

It is advantageous to add to the said organic liquid 0.5-5% by volume, preferably 1.5-2.5%, of an extractant chosen from the aforesaid group of extractants.

As in the above mentioned process for simultaneous extraction, the organic liquid may be here also pretreated with an acid solution and it may also contain up to 30% in volume of a stabilizer, preferably isodecanol. Moreover, antimony may be recovered from the organic liquid by treating it with a base in the solid or dissolved state, or with a metal powder cementing antimony, possibly after washing the organic liquid with water to re-extract the acid.

Antimony may also be selectively extracted from acid metal solutions containing arsenic, antimony and possibly phosphorus, and having a molar ratio (As + 4P):Sb at least equal to 8, by means of an organic liquid containing:
(a) 2–30% by volume, preferably 5–25% of an alkylated 8-hydroxyquinoline,
(b) 5–50% by volume of an organophosphoric acid having the general formula

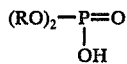

wherein R represents an unsubstituted or substituted hydrocarbon group
(c) 0.5–10% by volume of nonyl phenol acting as a stabilizer, and
(d) an inert organic diluent,
the acid content of the aqueous phase being maintained at at least 1N during the extraction in order to limit the co-extraction of other elements such as copper.

Antimony may be recovered from the organic liquid in the same way as that described above.

Arsenic may be extracted from the raffinate produced in the above processes for selective extraction of antimony, by means of an organic liquid containing an ester chosen from the group of esters consisting of the phosphonic acid esters having the general formula

the phosphonous acid esters having the general formula $R_1-P(OR_2)-OR_3$, the phosphinic acid esters with the general formula

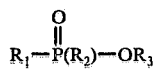

and the phosphinous acid esters having the general formula $R_1-P(R_2)-OR_3$, wherein $R_1$, $R_2$ and $R_3$ represent the same or different, unsubstituted or substituted hydrocarbon groups.

The said organic liquid may consist of such an ester in the non-diluted state of a solution of such an ester in an inert organic solvent. It may moreover contain a stabilizer such as isodecanol to facilitate phase separation.

It may be useful to pretreat the organic liquid with an acid solution before carrying out the extraction, although the acidity of the aqueous phase is not so critical as in the above described processes of simultaneous extraction of As and Sb and selective extraction of Sb.

After the extraction, the organic liquid may be regenerated either by treatment with water or by treatment with a base in the solid or dissolved state, arsenic being in this last alternative precipitated as arsenate. It is also possible to regenerate the organic liquid by means of a reducing agent, for instance $SO_2$, arsenic being separated in the form of salable arsenious anhydride. As the organic liquid extracts not only the arsenic, but also part of the acid, the said regeneration is advantageously carried out in two steps: in a first step the organic liquid is washed with water to recover the major part of the said which may be recycled to the extraction section, and in a second step the regeneration of the organic liquid is completed by treatment with one of the above mentioned substances.

In the above liquid-liquid extraction processes, the 7-[(3-(5,5,7,7-tetramethyl-1-octenyl)]-8-hydroxyquinoline (sold under the registered name of "KELEX-100" and made by Ashland Chemicals, Ohio, USA) may be advantageously used as alkylated 8-hydroxyquinoline, the diisobutyl ester of isobutylphosphonic acid (sold under the registered name of "HOSTAREX PO 212" and made by Hoechst of West Germany) as phosphonic acid ester, tributylphosphate as organophosphoric compound, di(2-ethylhexyl)phosphoric acid as organophosphoric acid, and the product sold under the registered name of "ESCAID-100" by Esso Chemical Cy, as inert diluent. Other suitable inert diluents include aliphatic and aromatic hydrocarbons such as benzene, toluene, xylene, fuel oil and kerosene.

It is to be noted that the last described process for arsenic extraction may be applied to acid solutions of any origin and of any acidity. The process may thus be applied successfully to the extraction of arsenic from solutions containing 5 to 100 g/liter of $H_2SO_4$ or 5 to 400 g/liter of HCl. The process is particularly well suited not only for the treatment of the above-described arsenic and antimony bearing materials, but also for the desarsenation of solutions from the copper electrorefining, especially from the bleed-off and for the purification of solutions for the electroextraction of copper.

It is further to be noted that all the above-mentioned liquid-liquid extraction processes are particularly efficient when arsenic is present in the pentavalent state, while the valency of antimony is of no importance in that respect.

For a better understanding of the invention reference is made to the following examples.

EXAMPLE 1

This example relates to the leaching of a speiss containing in % by weight:
2.7 Pb, 13.1 Cu, 25.4 Ni, 1.3 Co, 31.2 As; 18.3 Sb
Leaching conditions:
temperature: 60° C
duration: 6 hours
partial $O_2$ pressure: 10 kg/cm$^2$
leach solution:
  $H_2SO_4$: stoechiometrical amount to convert Cu, Ni, Co and Pb into sulphates
  $H_3AsO_4$: 200 g As/liter Concentration of the speiss: 200 g/liter
Results:
  Residue in % by weight: 20.8
  Composition of the residue in % by weight: 0.53 Co, 1 Ni, 19.2 Cu, 3.8 Sb, 18 As
  Composition of the final solution in g/liter: 2.38 Co, 50.4 Ni, 18.2 Cu, 35 Sb, 254.9 As.
  Dissolution rate in %: 91.5 Co, 99.2 Ni, 69.4 Cu, 95.6 Sb, 88 As.

EXAMPLE 2

This example relates to the leaching of the speiss of the example 1 under the following conditions:
temperature: 60° C
duration: 6 hours
partial $O_2$ pressure: 10 kg/cm$^2$
Leach solution:
  $H_2SO_4$: stoechiometrical amount to convert Cu, Ni, Co and Pb into sulphates
  $H_3PO_4$: 85 g/liter
concentration of the speiss: 200 g/liter
Results:
  Residue in % by weight: 10.5
  Composition of the residue in % by weight: 0.09 Co, 0.47 Ni, 29.8 Cu, 1.4 Sb, 2.1 As.
  Composition of the final solution in g/liter: 2.58 Co, 50.7 Ni, 19.9 Cu, 36.3 Sb, 62 As.
  Dissolution rate in %: 99.5 Co, 99.8 Ni; 76.1 Cu, 99.2 Sb, 99.3 As

EXAMPLE 3

This example relates to the simultaneous extraction of As and Sb from an aqueous solution containing in g/liter: 120 As, 9 Sb, 30 Cu and 110 free $H_2SO_4$.

The extraction was carried out by means of an organic liquid containing 20% KELEX-100, 30% HOSTAREX PO 212, 25% isodecanol and 25% ESCAID-100, the said organic liquid being pre-treated with a solution of $H_2SO_4$ of 200 g/liter.

The raffinate obtained after 7 extraction stages with a ratio organic/aqueous phase (O:A)=1, contains in g/liter: 110 free $H_2SO_4$, 4 As, 0.3 Sb, 28.7 Cu. These figures correspond to an extraction yields of 96% for As, 96% for Sb and 4% for Cu. As-Sb-Cu are separated during the re-extraction in the following way.
1. As is re-extracted by treating the organic liquid with a solution of $H_2SO_4$ of 40 g/liter
   O:A = 1:1 in 4 stages
   the eluate obtained contains in g/liter: 115.6 As, 0.8 Sb, 0.026 Cu, 70 $H_2SO_4$.
2. Re-extraction of the acid by washing with water.
3. Antimony is re-extracted by treatment with a solution of NaOH of 200 g/liter thus obtaining a residue containing 32% Sb and 1.62% As; (if As and Sb should remain dissolved in the eluate, KOH is used instead of NaOH).
4. Re-extraction of the copper and simultaneous acid pretreatment of the organic liquid by washing with a solution of sulphuric acid of 200 g/liter.
   O:A = 5:1
   The washing solution contains in g/liter: 0.001 Sb and 6.36 Cu.

Re-extraction yields are shown in the following table:

| Re-extraction yield during the operations | As | Sb | Cu |
| --- | --- | --- | --- |
| a) As re-extraction | 99.65 % | 9.1 % | 2 % |
| b) Sb re-extraction | 0.35 % | 90.8 % | 0.3 % |
| c) Cu re-extraction | — | — | 97.69 % |

EXAMPLE 4

A simultaneous extraction of As and Sb from an aqueous solution containing in g/liter: 90 As, 8.9 Sb, 30 Cu and 145 free $H_2SO_4$, is carried out with an organic liquid containing 20% KELEX-100, 40% tributylphosphate, 20% isodecanol and 20% ESCAID-100, pre-treated with a solution of $H_2SO_4$ of 200 g/liter.

The raffinate obtained after a seven stage extraction with O:A ratio = 1:1, contains in g/liter: 150 $H_2SO_4$, 5 As, 0.45 Sb and 30.2 Cu.

EXAMPLE 5

A selective Sb extraction from an aqueous solution containing in g/liter: 113.8 As, 8.85 Sb, 30 Cu and 150 free $H_2SO_4$, is carried out with an organic liquid containing 20% KELEX-100, 20% isodecanol, 2% HOSTAREX PO 212 and 58% ESCAID-100, pre-treated with a solution of $H_2SO_4$ of 200 g/liter.

The raffinate obtained after a four stage extraction with a O:A ratio = 1:1, contains in g/liter: 147 $H_2SO_4$, 105 As, 0.68 Sb and 29.6 Cu.

A treatment of the above raffinate for extracting arsenic with non-diluted HOSTAREX PO 212, pre-treated with a solution of $H_2SO_4$ of 200 g/liter allows of obtaining after a four stage extraction with a O:A ratio = 1:1 a raffinate containing in g/liter; 147 $H_2SO_4$, 3 As, 0.5 Sb and 29.6 Cu.

EXAMPLE 6

A selective Sb extraction from an aqueous solution containing in g/liter: 102 As, 5.9 Sb, 27 Cu and 370 free $H_2SO_4$, is carried out with an organic liquid containing 25% KELEX-120 (a mixture of 4 parts KELEX-100 and 1 part of nonylphenol), 30% di (2-ethylhexyl)phosphoric acid and 45% ESCAID-100, pre-treated with a solution of $H_2SO_4$ of 200 g/liter.

The raffinate obtained after a seven stage extraction with a O:A ratio = 1:1, contains in g/liter: 103.8 As, 0.57 Sb, 27.9 Cu and 368 $H_2SO_4$.

What we claim is:
1. In a process for treating a metal bearing material containing arsenic and antimony by leaching in an acid solution with an oxygen containing gas under pressure at a temperature of between 20° and 200° C, the improvement which consists in adding at least one element chosen from the group consisting of arsenic and phosphorus in such an amount to the leach mixture that the molar ratio (As + 4P):Sb therein shall be at least equal to 8, thus dissolving at least the major part of the arsenic and antimony contained in the starting material.

2. A process according to claim 1, in which antimony is selectively separated from the leach solution by bringing the said solution into contact with an organic phase comprising
   (a) 2–30% by volume of an alkylated 8-hydroxyquinoline, and
   (b) an inert organic diluent,
while maintaining the acid content of the aqueous phase at at least 1N, whereby antimony is selectively extracted from the aqueous phase to the organic phase, and separating the resultant antimony-charged organic phase from the resultant antimony-barren aqueous phase.

3. A process according to claim 2, in which arsenic is separated from the antimony-barren aqueous phase by bringing the latter into contact with an organic phase comprising an ester selected from the group of esters consisting of phosphonic acid esters having the general formula

phosphonous acid esters having the general formula $R_1 - P(OR_2) - OR_3$, phosphinic acid esters having the general formula

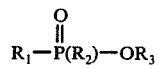

and phosphinous acid esters having the general formula $R_1 - P(R_2) - OR_3$, wherein $R_1$, $R_2$ and $R_3$ represent the same or different, unsubstituted or substituted hydrocarbon groups, whereby arsenic is extracted from the aqueous phase to the organic phase, and separating the resultant arsenic-charged organic phase from the resultant arsenic-barren aqueous phase.

4. A process according to claim 3, in which the arsenic charged organic phase is regenerated by bringing the latter into contact with a substance selected from the group of substances consisting of water, an aqueous solution of a base, a solid base and a reducing agent, thus producing an arsenic-charged aqueous or solid phase and an arsenic-barren organic phase.

5. A process according to claim 4, in which the arsenic charged organic phase is washed with water before being desarsenated.

6. A process according to claim 3, in which the ester is the diisobutyl ester of isobutylphosphonic acid.

7. A process according to claim 2, in which the antimony loaded organic phase is regenerated by bringing the latter into contact with a substance selected from the group of substances consisting of an aqueous solution of a base, a solid base and a powdered metal cementing antimony, thus producing an antimony-charged aqueous or solid phase and an antimony-barren organic phase.

8. A process according to claim 7, in which the antimony charged organic phase is washed with water before being brought into contact with the said substance.

9. A process according to claim 2, in which the alkylated 8-hydroxyquinoline is 7-[3-(5,5,7,7-tetramethyl-1-octenyl)]-8-hydroxyquinoline.

10. A process according to claim 2, in which the organic phase contains 0.5-5% by volume of a substance selected from the group of substances consisting of (a') phosphonic acid esters having the general formula

phosphonous acid esters having the general formula $R_1 - P(OR_2) - OR_3$, phosphinic acid esters having the general formula

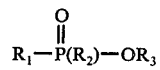

and phosphinous acid esters having the general formula $R_1 - P(R_2) - OR_3$, wherein $R_1$, $R_2$ and $R_3$ represent the same or different, unsubstituted or substituted hydrocarbon groups, and (b') organophosphoric compounds having the general formula $(RO)_3 P = O$, wherein R represents an unsubstituted or substituted alkyl, aryl or aralkyl group.

11. A process according to claim 2, in which the organic phase is brought into contact with an acid solution before being brought into contact with the leach solution.

12. A process according to claim 2, in which the organic phase contains up to 30% by volume of a long chain aliphatic alcohol as emulsion inhibitor.

13. A process according to claim 1, in which arsenic and antimony are separated simultaneously from the leach solution by bringing the said leach solution into contact with an organic phase comprising (a) 2-30% by volume of an alkylated 8-hydroxyquinoline, (b) 5-80% by volume of a substance selected from the group of substances consisting of (a') phosphonic acid esters having the general formula

phosphonous acid esters having the general formula $R_1 - P(OR_2) - OR_3$, phosphinic acid esters having the general formula

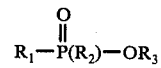

and phosphinous acid esters having the general formula $R_1 - P(R_2) - OR_3$, wherein $R_1$, $R_2$ and $R_3$ represent the same or different, unsubstituted or substituted hydrocarbon groups, and (b') organophosphoric compounds having the general formula $(RO)_3 P = O$, wherein R represents an unsubstituted or substituted alkyl, aryl or aralkyl group, and (c) an inert organic diluent, while maintaining the acid content of the aqueous phase at at least 1N, whereby arsenic and antimony are extracted from the aqueous phase to the organic phase, and separating the resultant arsenic and antimony charged organic phase from the aqueous phase.

14. A process according to claim 13, in which the arsenic and antimony charged organic phase is regenerated by (1) bringing the latter into contact with a re-extractant selected from the group of re-extractants consisting of water and an aqueous acid solution having an acid content of less than 1N, thus producing an arsenic-charged aqueous phase and an antimony-charged organic phase, (2) separating the phases produced in (1), and (3) bringing the antimony charged phase into contact with a substance selected from the group of substances consisting of an aqueous solution of a base, a solid base and a powdered metal cementing antimony, thus producing an antimony-charged aqueous or solid phase and an antimony-barren organic phase.

15. A process according to claim 14, in which the antimony charged organic phase separated in (2) is washed with water before being directed to (3).

16. A process according to claim 13, in which the alkylated 8-hydroxyquinoline is 7-[3-(5,5,7,7-tetramethyl-1-octenyl)]-8-hydroxyquinoline.

17. A process according to claim 13, in which the phosphonic acid ester is the diisobutyl ester of isobutylphosphonic acid.

18. A process according to claim 13, in which the organophosphoric compound is tributylphosphate.

19. A process according to claim 13, in which the organic phase is brought into contact with an acid solution before being brought into contact with the leach solution.

20. A process according to claim 13, in which the organic phase contains up to 30% by volume of a long chain aliphatic alcohol as emulsion inhibitor.

21. A process according to claim 1, in which antimony is selectively separated from the leach solution by bringing the said solution into contact with an organic phase comprising (a) 2–30% by volume of an alkylated 8-hydroxyquinoline, (b) 5–50% by volume of an organophosphoric acid having the general formula

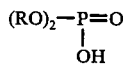

wherein R represents an unsubstituted or substituted hydrocarbon group, (c) 0.5–10% by volume of nonyl-phenol; and (d) an inert organic diluent, while maintaining the acid content of the aqueous phase at at least 1N, whereby antimony is selectively extracted from the aqueous phase to the organic phase, and separating the resultant antimony-charged organic phase from the resultant antimony-barren aqueous phase.

22. A process according to claim 21, in which the antimony charged organic phase is regenerated by bringing the latter into contact with a substance selected from the group of substances consisting of an aqueous solution of a base, a solid base and a powdered metal cementing antimony, thus producing an antimony charged aqueous or solid phase and an antimony-barren organic phase.

23. A process according to claim 22, in which the antimony charged organic phase is washed with water before being brought into contact with the said substance.

24. A process according to claim 21, in which the alkylated 8-hydroxyquinoline is 7-[3-(5,5,7,7-tetramethyl-1-octenyl)]-8-hydroxyquinoline.

25. A process according to claim 21, in which the organophosphoric acid is di(2-ethylhexyl)phosphoric acid.

26. A process according to claim 21, in which the organic phase is brought into contact with an acid solution before being brought into contact with the leach solution.

27. A process according to claim 1, in which the said molar ratio is comprised between 10 and 40.

28. A process according to claim 1, in which the arsenic concentration in the leach solution is less than about 250 g/liter.

29. A process according to claim 1, in which the said element is added as a compound chosen from the group consisting of trivalent and pentavalent oxides and acids of arsenic and phosphorus.

30. A process according to claim 1, in which the amount of acid is limited to what is required to convert the metals contained in the starting material into salts.

31. A process according to claim 1, in which the said acid solution is a solution of sulphuric acid.

32. A process according to claim 1, in which the said acid solution is selected from the group consisting of arsenic acid and phosphoric acid solutions, and the leaching is completed by an addition of sulphuric acid in an amount at least equal to that required to convert the metals contained in the starting material into sulphates.

33. A process according to claim 1, in which the said oxygen containing gas is selected from the group consisting of air, oxygen-enriched air and oxygen.

34. A process according to claim 1, in which the said metal bearing material is a speiss.

35. A process according to claim 34, in which a temperature of between 50° and 70° C is maintained.

36. A process for separating simultaneously arsenic and antimony from an aqueous acid solution having a molar ratio (As + 4P) : Sb at least equal to 8, which process comprises bringing the aqueous solution into contact with an organic phase comprising (a) 2–30% by volume of an alkylated 8-hydroxyquinoline, (b) 5–80% by volume of a substance selected from the group of substances consisting of (a′) phosphonic acid esters having the general formula

phosphonous acid esters having the general formula $R_1 — P(OR_2)—OR_3$, phosphinic acid esters having the general formula

and phosphinous acid esters having the general formula $R_1 — P(R_2)—OR_3$, wherein $R_1$, $R_2$ and $R_3$ represent the same or different, unsubstituted or substituted hydrocarbon groups, and (b′) organophosphoric compounds having the general formula $(RO)_3P = O$, wherein R represents an unsubstituted or substituted alkyl, aryl or aralkyl group, and (c) an inert organic diluent, while maintaining the acid content of the aqueous phase at at least 1N, whereby arsenic and antimony are extracted from the aqueous phase to the organic phase, and separating the resultant arsenic and antimony-charged organic phase from the aqueous phase.

37. A process for separating selectively antimony from an aqueous acid solution containing antimony and arsenic and having a molar ratio (As + 4 P) : Sb at least equal to 8, which process comprises bringing the aqueous solution into contact with an organic phase comprising
 (a) 2–30% by volume of an alkylated 8-hydroxyquinoline, and
 (b) an inert organic diluent,
while maintaining the acid content of the aqueous phase at at least 1N, whereby antimony is selectively extracted from the aqueous phase to the organic phase, and separating the resultant antimony-charged organic phase from the resultant antimony-barren aqueous phase.

38. A process for separating selectively antimony from an aqueous acid solution containing antimony and arsenic and having a molar ratio (As + 4P) : Sb at least equal to 8, which process comprises bringing the aqueous solution into contact with an organic phase comprising
 (a) 2–30% by volume of an alkylated 8-hydroxyquinoline,
 (b) 5–50% by volume of an organophosphoric acid having the general formula $$(RO)_2-\underset{\underset{OH}{|}}{P}=O$$

wherein R represents an unsubstituted or substituted hydrocarbon group.
 (c) 0.5–10% by volume of nonyl-phenol, and
 (d) an inert organic diluent,
while maintaining the acid content of the aqueous phase at at least 1N, whereby antimony is selectively extracted from the aqueous phase to the organic phase, and separating the resultant antimony-charged organic phase from the resultant antimony-barren aqueous phase.

* * * * *